US006429867B1

(12) United States Patent
Deering

(10) Patent No.: US 6,429,867 B1
(45) Date of Patent: Aug. 6, 2002

(54) SYSTEM AND METHOD FOR GENERATING AND PLAYBACK OF THREE-DIMENSIONAL MOVIES

(75) Inventor: Michael F. Deering, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/268,397

(22) Filed: Mar. 15, 1999

(51) Int. Cl.[7] .............................................. G06T 17/00
(52) U.S. Cl. ........................................................ 345/423
(58) Field of Search .......................... 345/418, 44, 420, 345/421, 422, 423, 424, 425

(56) References Cited

U.S. PATENT DOCUMENTS

| | | | |
|---|---|---|---|
| 5,446,834 A | | 8/1995 | Deering |
| 5,793,371 A | | 8/1998 | Deering |
| 5,805,733 A | * | 9/1998 | Wang et al. ................ 382/232 |
| 5,842,004 A | | 11/1998 | Deering et al. |
| 5,867,167 A | | 2/1999 | Deering |
| 5,905,502 A | | 5/1999 | Deering |
| 6,009,208 A | * | 12/1999 | Mitra et al. ................. 382/254 |

OTHER PUBLICATIONS

Deering, "Geometry Compression," Computer Graphics Proceedings, Annual Conference Series, 1995, pp. 13–20.
Séquin et al., "Parameterized Ray Tracing," Computer Graphics, vol. 23, No. 3, Jul. 1989, pp. 307–314.
Cook et al., "The Reyes Image Rendering Architecture," Computer Graphics, vol. 21, No. 4, Jul. 1987, pp. 95–102.
Upstill, *The RenderMan Companion*, Copyright by Pixar 1990, pp. 137–146, 171–178, 193–200, 209–237, 273–285, and 287–309.
Bjernfalk, "The Memory System Makes The Difference," © 1999 Evans & Sutherland Computer Corporation, pp. 1–11.

* cited by examiner

*Primary Examiner*—Cliff N. Vo
(74) *Attorney, Agent, or Firm*—Conley, Rose & Tayon PC

(57) ABSTRACT

A system and method for generating and playing back three-dimensional (3D) movies are disclosed. The system is capable of partially rendering frames without relying upon exact viewpoint information. The partially rendered frames may be rendered to the extent possible without performing viewpoint-dependent processes, and then compressed and stored to a carrier medium. To reduce the amount of data to be stored, the viewer's possible viewpoints may be restricted (e.g., by defining a viewpoint-limiting volume or region). The resulting partially-rendered geometry data may be compressed using geometry compression. During playback, the compressed frames are read as a stream, and decompressed. Any final viewpoint-dependent rendering operations may then be performed (e.g., some lighting calculations and atmospheric effects, some fogging, specular highlighting, and reflections). A sensor such as a head-tracker may provide real-time viewpoint information that may be used by the playback system. After rendering, the frames are rasterized and then displayed in stereo.

49 Claims, 7 Drawing Sheets

SYSTEM AND METHOD FOR GENERATING AND PLAYBACK OF THREE-DIMENSIONAL MOVIES

BACKGROUND OF THE INVENTION

1. Field of the Invention

This invention relates generally to the field of computer graphics and, more particularly, to three-dimensional (3D) movies.

2. Description of the Related Art

Traditional motion pictures provide the audience with what may be called a "two-dimensional" experience. Most motion pictures are projected on flat screens with the audience observing the movie from afar. Aside from improvements in sound playback and larger film/screen formats, the movie going experience has not changed significantly for a number of years.

Some films have been produced in visual stereo, e.g., with the audience wearing red-blue or polarized glasses. Similarly, head-mounted displays have also allowed viewers to see visual stereo images and films. But visual stereo has not seen widespread success relative to standard motion pictures. This may be because the stereo-effect is typically limited to a few special effects where a few objects appear to have dimension or "leap out" at the audience. It is likely that the effects that simple visual stereo provides does not outweigh the added cost of production and the hassle of wearing glasses or head-mounted displays to view the image.

However, recent advances in computer graphics and display technologies have hinted at the possibility of a more realistic experience for moviegoers. New sensing technologies such as head-tracking may increase realism from simple visual stereo to a truly three-dimensional (3D) viewing experience.

As used herein, the term "visual stereo" refers to the process of generating two images (i.e., one for the viewer's left eye and another for the viewer's right eye). These images may be referred to herein as stereo component images. In contrast to simple visual stereo, 3D images and movies go one step further by dynamically changing the viewpoint (ideally on a frame-by-frame basis) for each of the two stereo component images. In this way, an object viewed in 3D will not only appear to leap out of the screen, but objects behind it will become obscured or un-obscured as the viewer changes their viewpoint to different positions around the object. In other words, a traditional stereo image of a globe will appear to have depth, but a three-dimensional image of the globe will allow the viewer to move around the globe to see more than one side of it.

Thus, head tracking sensors allow graphics systems to recalculate the component images according to where the viewer is in relation to the display device. Head tracking may allow a coffee table display to display a 3D football game that viewers can view from almost any angle they desire (e.g., from a bird's eye view directly overhead or from the side of the fifty yard line). To change their viewpoint, viewers simply move around the coffee table. The head-tracking sensors will determine where the viewer is and display different component images accordingly. When used in connection with a head-mounted display, head tracking allows panoramic scenes that "wrap-around" viewers without the need for large projection screens that physically surround the viewer. Such head-tracked stereo systems produce a look-around holographic feel qualitatively different from older fixed image displays.

However, these new systems have yet to see widespread acceptance as movie playback devices. One reason is that these systems typically rely upon re-rendering each scene every time the viewer changes their viewpoint. For example, as the viewer's head changes position (or orientation, in some systems), the scene being displayed is re-rendered from scratch using the new viewpoint. To produce a realistic computer-generated image, a tremendous number of calculations must be performed. Even with current advances in microprocessors, most systems still fall significantly short of being able to render detailed realistic scenes in real-time. Given the high frame rates needed for smooth movie-like animation, it may be many years before processing power approaches the levels necessary to completely render complex images (e.g., like those in the movie Toy Story) at frame rates high enough to rival current motion pictures.

Thus, an efficient system and method for generating and playing back realistic 3D movies with viewer-changeable viewpoints in real-time is desired. In particular, a system and method capable of reducing the number of calculations to be performed for real-time playback of 3D movies is desired.

SUMMARY OF THE INVENTION

The problems outlined above may at least in part be solved by a system capable of partially rendering frames without relying upon exact viewpoint information. The partially rendered frames may be rendered to the extent possible without performing viewpoint-dependent processes, and then compressed and stored to a carrier medium. To reduce the amount of data to be stored, the viewer's possible viewpoints may be restricted (e.g., by defining a viewpoint-limiting volume or region).

During playback, the compressed frames are read as a stream, decompressed, and then rasterized for display. As part of the rasterization process, the viewer's viewpoint may be determined and used to perform viewpoint-dependent effects such as some lighting and atmospheric effects (e.g., fogging, specular highlighting, and reflections).

As used herein the term "real-time" refers to performing an action, task, or process rapidly enough so that the user or viewer will not be substantially distracted by the amount of time taken to perform the task. As used herein, the term "including" means "including, but not limited to."

Movies may be thought of as linear story telling. Thus, in 3D movies the viewer may be like Scrooge (i.e., dragged along by ghosts of Christmas past, present, and future). The viewer can see everything in partial or full three dimensions, but generally may not interact with anything (in some embodiments interaction may be allowed). Furthermore, the viewer can only go to the places where the ghost goes. Note that this covers not only pre-scripted linear story telling, but also most forms of remote viewing (e.g., live sporting events).

Looked at another way, current general-purpose computers take much longer to place and create non-trivial geometry than special purpose rendering hardware does to render it (albeit with simplistic hardwired surface shaders). This trend is likely to get worse rather then better for some time to come. But for pre-scripted linear story telling, nearly all the geometry creating and much of the surface shading can be pre-computed. Thus, the primary run-time task is the rendering of large numbers of colored micropolygons. Therefore, 3D movies may be produced and viewed by rendering (e.g., in real time or near real time) streams of compressed geometry (e.g., in a head-tracked stereo viewing environment).

Linear narratives may be pre-computed using arbitrarily complex animation, physics of motion, shadowing, texturing, and surface modeling techniques, but with the viewpoint-dependent image-rendering deferred until playback time. The geometry may be produced by a geometry shader that outputs micropolygons in world-space via programmable shaders in a realistic rendering package (e.g., Pixar's RenderMan). The technology may be used for a number of different applications, including entertainment, scientific visualization, and live 3D television.

In one embodiment, a method for generating three-dimensional movies comprises receiving three-dimensional graphics data representing a scene. A viewpoint limitation (e.g., a volume or a two-dimensional region with or without orientation limitations) is specified for said scene. Next, one or more frames representing the scene are partially rendered. These partially rendered frames are then compressed and output to a carrier medium for storage or transmission.

"Partially rendering" may comprise performing one or more non-viewpoint dependent (i.e., viewpoint-independent) calculations, such as some lighting calculations (e.g., viewpoint-independent reflections, viewpoint-independent shadows, viewpoint-independent depth of field effects, viewpoint-independent bump mapping, and viewpoint-independent displacement mapping) and tessellating the three-dimensional graphics data into micropolygons to meet one or more predetermined criteria. These predetermined criteria may include smoothness and micropolygon size in world space. In other embodiments they may also include estimated worst-case micropolygon size in screen space. This estimated worst-case micropolygon size in screen space may be estimated using the distance from a closest permitted viewpoint to each micropolygon and or the worst-case angle from all permitted viewpoints to the micropolygon.

In addition to geometry compression, in some embodiments the micropolygons may be culled by deleting micropolygons that are not visible from any valid viewpoint (i.e., from any viewpoint that satisfies the specified viewpoint limitations. The compressed frames are configured to be rasterized in real-time by applying viewpoint-dependent lighting effects. Frames may be stored separately, or they may be reused as a basis for interpolation. The specified viewpoint limitation information may also be stored with the frames for use during playback.

A method for playing back 3D movies is also contemplated. In one embodiment, the method may comprise reading a plurality of compressed frames from a carrier medium and then decompressing the compressed frames into a plurality of world-space micro-polygons. The viewer may then provide input (e.g., via a head-tracker) as to where the viewpoint should be. Using this viewpoint, the micropolygons may be translated to screen-space, and then rasterized to generate a frame for display on a display device.

In one embodiment, the playback unit may also apply viewpoint-dependent lighting, texturing, atmospheric, depth-of-field and or other effects to the micropolygons. The rasterization may be performed in real-time, with real-time viewer viewpoint information from head-trackers. Compressed audio may also be read with the compressed 3D movie frames, and the audio may be manipulated to reflect the viewer's ear location information (e.g., as provided by a head-tracker).

A software program and computer system configured to generate three-dimensional movies are also contemplated.

The software program may comprise a plurality of instructions, wherein the instructions are configured to perform the method of generating 3D movies as described above. Similarly, a software program and playback system configured to playback 3D movies are also contemplated.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
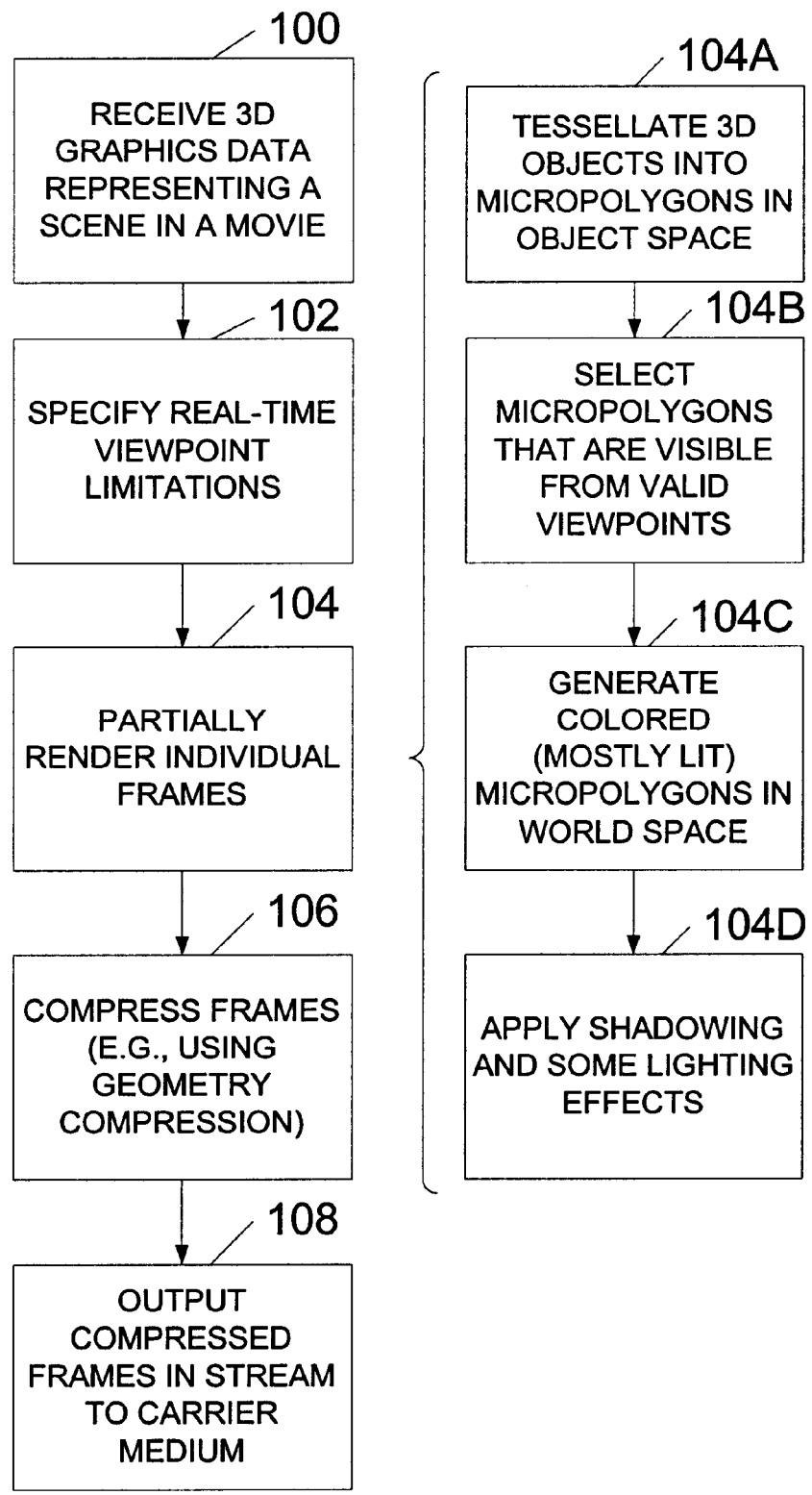
FIG. 1 is a flowchart illustrating one embodiment of a method for generating three-dimensional (3D) movies.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Method for Generating Three-Dimensional Movies—FIG. 1

FIG. 1 is a flowchart illustrating one embodiment of a method for generating three-dimensional (3D) movies. First, three-dimensional (3D) graphics data representing a scene in a movie is received (step 100). The 3D graphics data may include data in a number of different formats. For example, three-dimensional objects that are part of the scene may be represented as volumes, surfaces, or 3D objects that have been tessellated into a plurality of polygons (e.g., triangles or quadrilaterals). The 3D graphics data may also include objects modeled with NURBS (non-uniform rational B-splines), volume elements, subdivision surfaces, meshes and other techniques. The 3D data may be generated by computer animators, by 3D scanning devices, 3D cameras, 3D digitizers, or other techniques. Depending upon the format in which the 3D graphics data is received, it may be manipulated and transformed before being transformed into a 3D movie Once the data has been received, real-time viewpoint limitations may be specified (step 102). For example, if a scene in the movie involves a car chase, the viewer's viewpoint may be limited to positions within a police car chasing down a felon fleeing a crime scene. Viewpoint limitations may be specified in a number of different ways. One possible method is specifying a viewpoint limitation volume. Any user-specified viewpoints for the particular scene will be processed as valid. However, if the viewer attempts to change their viewpoint to a position outside the specified limitation volume, then the playback system will force the viewpoint to remain within the predetermined viewpoint volume (more details on the playback system are described further below). This may prevent users from traveling beyond the bounds of the current scene (e.g., through walls). This may also constrain the amount and tessellation of micropolygons, and may also avoid some playback level-of-detail issues.

In addition to limiting the viewer's viewpoint by position (i.e., where the viewer is), limitations on the orientation of the viewpoint (i.e., which direction the viewer is looking) may also be specified. Returning once again to the car chase example, if the user is limited to viewpoints within the police car chasing the felon, the viewer may be limited to viewpoint orientations that are directed out the windshield of the police car. This may prevent the viewer from missing an explosion caused by the felon crashing his vehicle into a gasoline station because the viewer was looking out the police car's back window.

Next, the 3D graphics data may be partially rendered (step 104). As shown by the figure, a number of different processes may be performed as part of partially rendering the 3D graphics data. First, the 3D graphics data may be tessellated into "micropolygons" positioned in object space (step 104A). Traditional micropolygons are polygons that have a size near or below a single pixel in screen space. However, since tessellation into micropolygons is performed without knowing the exact viewpoint, some estimations may be performed when tessellating. For example, since micropolygon size is related to the distance from the viewpoint to the micropolygon, the worst-case (e.g., the closest) viewpoint may be used when tessellating. Similarly, micropolygon size may also be related to the angle from the viewpoint to the micropolygon. Thus a worst-case angle may also be used during tessellation. The distance and angle may be used separately or in combination to obtain the desired tessellation. The use of properly sized micropolygons may improve the realism of the final image produced when compared with using large triangles having areas covering many pixels. In some embodiments, partial rendering may be performed using a specialized "geometry shader" as described in greater detail below.

Based upon the viewpoint limitations specified during step 102, certain micropolygons may be eliminated from the 3D graphic data if they cannot influence visible pixels in the final image (step 104B). For example, if the 3D graphics data contains a tree and the viewer's viewpoint is limited to positions and orientations far above the tree, then the leaves on the lower branches of the tree may be eliminated (i.e., culled) if there is no way the viewer could possibly see them from within the specified viewpoint limitation volume.

Next, the selected micropolygons that are visible from valid viewpoints may be "mostly lit" and colored (step 104C). The micropolygons are "mostly lit" by applying viewpoint-independent lighting and then calculating color information for each micropolygon vertex. The micropolygons are referred to as "mostly lit" because some final lighting that is viewpoint-dependent is not applied at this stage. Instead, the final viewpoint dependent component of the lighting (e.g., reflections and specular highlighting) may be applied during playback. This may be changed on a per-frame basis. For example, some frames or scenes may not have any viewpoint-dependent lighting components. Others may have a large number of viewpoint-dependent lighting components. In some embodiments, the lighting and coloring calculations may be performed in world space (other spaces such as object space may also be used). Included in lighting and color calculations are non-viewpoint-dependent aspects of processes such as texture mapping, most shadowing, some atmospheric effects, some depth of field effects (step 104D). For example, shadows cast by objects are typically viewpoint-independent. Thus, in some embodiments the determination of whether a particular light source contributes completely, partially, or not at all to the lighting calculation may be performed at this stage. Viewpoint-dependent components such as specular components can be deferred until playback.

As used herein, a calculation is "viewpoint-independent" if the calculation may be performed without reference to the particular viewpoint used by the viewer to view the scene or if the calculation may be performed using only the viewpoint limitations defined for the scene. For example, if the viewpoint is limited to the interior of a car, trees that are in the distant background may have depth of field effects applied during partial rendering. This is because the range of permissible viewpoints is small relative to the distance from all possible viewpoints to the trees.

Once partial rendering (step 104) has been completed, each individual frame of micropolygons (still in world space) may be compressed (step 106). While a number of different types of compression are possible, geometry compression may be particularly effective for reducing the storage requirements of the micropolygons. One such method of geometry compression is described in U.S. Pat. No. 5,793,371 entitled "Method and Apparatus for Geometric Compression of Three-Dimensional Graphics Data" issued on Aug. 11, 1998.

With the enormous number of micropolygons generated by each frame geometry compression is useful to be able to reduce the storage requirements for the frames. During play-back, use of compression also greatly reduces the bandwidth necessary for real-time transfer of the frames from disk. To render the compressed geometry in real-time, a compression format that supports hardware decompression may be particularly useful.

Finally, the compressed frames may be output to a carrier medium (step 108). In some embodiments, the compressed frames may be stored to a computer-readable medium such as RAM, ROM, flash memory, CD-ROM, DVD-ROM, or magnetic disk. In one embodiment, the frames may be streamed to an array of DVD-ROM recorders (e.g., in a RAID configuration). In other embodiments, the compressed frames may be streamed to a transmission medium such as a computer network line or wireless/satellite link coupled to the Internet or broadcast (e.g., VHF or UHF).

Depending upon the amount of data to be stored and the speed of the playback hardware, each frame may be stored as a completely separate set of micropolygons. In another embodiment, portions of some frames may be reused. In still other embodiments, only key frames may be completely stored (with intermediate frames being interpolated during playback from key frames).

Note that the flowchart depicted in FIG. 1 is for explanatory purposes and is not meant to be limiting. In some embodiments, the steps may be performed in a different order, in parallel (e.g., steps 102 and 104A), or some steps be eliminated (e.g., step 104A or the shadowing of step 104D). Additional steps may also be performed.

In some embodiments, each frame may be stored as a separate compressed object in a separate file (e.g., 3 megabytes in size). For playback, these individual files may then be loaded into a main memory and rendered sequentially. Depending upon the exact embodiment, each frame may have one or more of the following associated with it: (i) a list of specular light sources, (ii) a viewpoint-limiting volume constraining allowable viewpoints, (iii) a list of specular materials, (iv) an array of compressed geometry objects, and (v) a list of bindings of specular materials and light sources to compressed geometry objects.

As previously noted, in some embodiments the director/cinematographer may constrain the viewer to a particular region to prevent the viewer from wandering randomly around the virtual set. Depending upon the desired effect, such a region may still allow for movement of the viewer's body within a several foot volume for effective stereo display. The micropolygon generation need not be uniform in world space (e.g., it may be uniform within a range of tolerances over the limited sighting angles). This allows objects much further away to be tessellated into corresponding larger micropolygons. There is also the opportunity for backface and occlusion culling of objects or portions of objects that are not visible from any allowed view angle on a given frame. This may also be useful when capturing micropolygons from the physical world. 3D cameras need not capture all possible surfaces. Instead, only those potentially visible from the possible view angles may be captured.

Geometry Shader

Many programmable shaders, e.g., the surface shader in Pixar's RenderMan application, are a super set of the processing needed for partially rendering 3D movies as described above. In these programmable shaders, surfaces are typically tessellated into polygons (e.g., quadrilaterals or triangles) that meet a specified criteria such as surface curvature, size in screen space, or size in world space. Given explicit constraints on playback viewpoint and screen resolution, render screen space size criteria may also be chosen to generate controlled screen-space-size polygons at playback. Typical shader programs then apply a lighting and shading model to these micropolygons, including texture and shadow map look-up, ambient and diffuse lighting calculations, or even radiosity computations. These calculations are typically applied in world space if effects such as displacement shaders are to be supported. Normally, as a final step, the micropolygon is projected into screen space, and then rasterized into a z-buffered frame buffer.

However, some shading languages explicitly support the concept of a geometry shader, in which the final projection and rasterization steps are not applied. Instead, the lit micropolygons are output. For example, the print command in Pixar's RenderMan version 3.8 may be used to extract lit micropolygons. Because RenderMan internally defers final mesh connectivity until the rasterization stage, the world space micropolygons generated by this print command are unstitched quad meshes from a higher order surface tessellation. As a post process, the connectivity information may be recomputed and stitching strips may be added to fill in the cracks. This may significantly increase (e.g., double) the number of micropolygons. An intelligent re-tessellator may be used to reduce this overhead.

To handle the deferral of specular lighting to play-back time, a custom shader that excludes specular computations may be used. To make sure that occlusion culling is not overly aggressive, all opaque surfaces may be set to be very slightly transparent (e.g., 0.9999). Otherwise, the custom shader may differ little from more traditional RenderMan shaders. Effects applied after the micropolygons are extracted (e.g., motion blur and final anti-aliasing), do not show up in the compressed triangle stream. Some view dependent effects, such as reflection or environment mapping, and atmospheric shaders may be excluded or used with care. Transparency may also require particular attention.

Alternately, colored micropolygons can be extracted from real world scenes by the use of 3D scanners or cameras. Eventually, real-time 3D capture, conversion to geometry, compression, and transmission may support a form of 3D television. While such geometry acquisition is technically challenging, the same method described herein could be used for playback.

A geometry compressor may be added as an output processor on the stream of micropolygons generated by RenderMan. In one embodiment, the triangles may have individual vertex normal and color components. Changes in specular color and specular power may be encoded at a higher object level for use at run-time. The same may be done with the color and placement of the specular light sources. Shadowing of objects from specular lights can be achieved by breaking up each object by the light sources used. In some embodiments with both per-vertex colors and normals present, the compressed geometry may average about 7 bytes per triangle. Other sizes and compression ratios are also possible and contemplated. For example, more specialized microtriangle compression techniques may potentially be able to reduce the average microtriangle storage requirement to 2 or 3 bytes.

One possible rendering configuration may allow a "budget" of one quarter of a million triangles per frame and a playback rate of 24 frames per second. Other values and rates are also contemplated, e.g., 400 thousand triangles per frame and a playback rate of 15 Hz. Assuming each triangle comprises 7 bytes of information, a sustained data transfer rate of about 42 megabytes per second may be useful in such an embodiment. One possible method for achieving this transfer rate is an array of three-way-interleaved fiber-channel disk drives or possibly an eight-way-interleaved array of consumer 5X DVD drives. With a storage capacity of 8.5 megabytes per side, eight DVD disks would support 17 minutes of continuous playback. Of course, faster 3D rendering hardware would change these numbers, but so would better compression techniques. Other configurations and data rates are also possible and contemplated.

Note that each of the methods described herein may be implemented solely in software, solely in hardware, or as a combination of both software and hardware.

Figure 2:
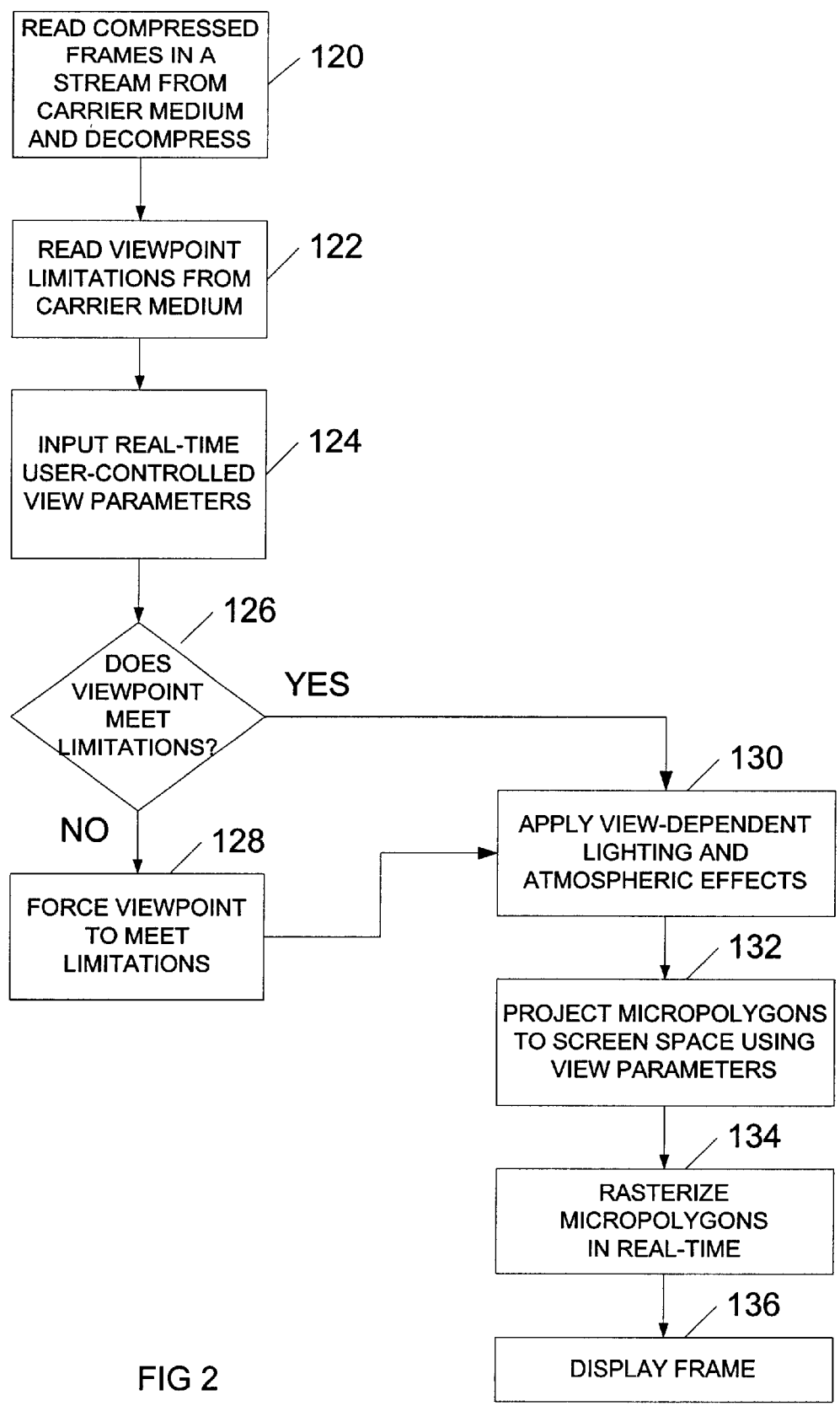
FIG. 2 is a flowchart illustrating one embodiment of a method for playing back three-dimensional (3D) movies generated using the method of FIG. 1.

Method for Playing Back Three-Dimensional Movies—FIG. 2

FIG. 2 is a flowchart illustrating one embodiment of a method for playing back three-dimensional (3D) movies generated using the method of FIG. 1. First, a stream of compressed frames is read and decompressed from a carrier medium (step 120). As previously noted, the carrier medium may be either a transmission medium or a computer readable medium. In one embodiment, the 3D movie may be distributed by the Internet. In another embodiment, the 3D movie may be distributed as a set of DVD-ROMs that are configured to be simultaneously played back using an array of DVD-ROM players in a RAID configuration.

During playback, the playback system may be configured to receive viewer input as to where the viewer desires their viewpoint to be and (optionally) in which direction they desire to look (step 124). This information may be received in a number of different ways. For example, a head-tracking sensor may be used to determine the position of a viewer relative to the display device. Similarly a data glove, wand, joystick, or keyboard may be used to receive information as to where the viewer desires the viewpoint to be positioned. Other alternatives include head tracking using an infrared reflective dot placed on the user's forehead, or using a pair of glasses with head- and or eye-tracking sensors built in. One method for using head tracking and hand tracking is disclosed in U.S. Pat. No. 5,446,834 (entitled "Method and Apparatus for High Resolution Virtual Reality Systems Using Head Tracked Display," by Michael Deering, issued Aug. 29, 1995). Other methods for head tracking are also possible and contemplated (e.g., infrared sensors, electromagnetic sensors, capacitive sensors, video cameras, sonic and ultrasonic detectors, clothing based sensors, video tracking devices, conductive ink, strain gauges, force-feedback detectors, fiber optic sensors, pneumatic sensors, magnetic tracking devices, and mechanical switches). This viewer viewpoint-related information may be received in real time (e.g., at or near the frame playback rate) or near real time.

For each frame, the viewer's viewpoint information may be processed along with the previous viewpoint information and the viewpoint limitation read from the carrier medium. For example, hysteresis may be implemented so that subtle movements of the viewer's head (in embodiments utilizing a head-tracker for viewpoint information) do not introduce a "jitter" in the viewpoint. As part of this processing, the playback system may be configured to compare the calculated viewpoint with the viewpoint limitation information (step 126). If the viewer's specified viewpoint for a particular frame is outside the particular frame's viewpoint-limiting volume, then the system may be configured to force or limit the current viewpoint to the closest viewpoint to the viewer's specified viewpoint that meets the frame's specified viewpoint limitations (step 128).

Next, once the viewpoint for the frame has been determined, the playback system may be configured to apply viewpoint-dependent lighting and other viewpoint-dependent optional effects, e.g., atmospheric effects, specular highlights, reflections, and depth of field effects (step 130). The amount of processing may be varied on a per-frame basis to maintain a minimum desired frame rate. In some embodiments, the 3D movie producers may also dynamically adjust the amount of viewpoint-dependent processing necessary to maintain a minimum frame rate during playback (e.g., based on a particular minimum playback system configuration). Other embodiments of the playback system may be configured to perform as much viewpoint-dependent processing as possible given a predetermined minimum frame rate. If the frame rate is about to drop below the minimum, the playback system may be configured to reduce or eliminate certain viewpoint-dependent effects (e.g., eliminating any reflections).

Next, the micropolygons may be translated from world-space to screen space based on the viewpoint for the particular frame (step 132). The screen-space micropolygons may then be rasterized into a buffer (e.g., a frame buffer or sample buffer) for eventual display (step 136).

A number of different displays may be used in the playback system. For example, head-mounted displays, traditional CRT displays, gas plasma displays, LCD displays, traditional projectors (CRT, LCD, or digital micromirror), or ocular projectors that project images directly onto the viewer's retina may all be used. If the display device is not head-mounted, glasses may be worn by viewers to separate the image perceived by each eye. The glasses may be passive color filters (e.g., red-blue or red-green), passive polarized, or active (e.g., LCD-shutter type). In some embodiments using non-head-mounted displays, such eyeglasses may be optional.

In some embodiments, the micropolygons may be rasterized into a sample buffer that stores multiple samples per display pixel. These samples may then be filtered to generate visually pleasing anti-aliased images. In addition, some embodiments may be configured to support multiple viewers simultaneously. Each viewer may have their own viewpoint and display. The playback system may be configured to render a different stereo image for each viewer based upon each viewer's particular viewpoint.

In some more complex embodiments, the playback system could perform some viewpoint-dependent occlusion-culling operations to reduce the depth complexity. If objects were compressed at multiple levels-of-detail and decoded in a viewpoint-dependent method, then the constraints on allowable viewing positions could be reduced (at the cost of increasing the amount of data stored and transferred for each frame). Objects with non-specular shading that does not change between frames (e.g., background objects) may be transmitted or stored only at key frames in the file (e.g., similar to MPEG 2 compression I-frames). In other embodiments, some dynamically animated objects may be included in frames to add an additional level of interaction. Branch points to different animation or movie sequences could be also added (e.g., like those used in CD-I). Compressed audio may also be read with the compressed 3D movie frames, and the audio may be manipulated to reflect the viewer's ear locations (as provided by the head-tracker) and to improve realism.

Playback System—FIGS. 3–6

Figure 3:
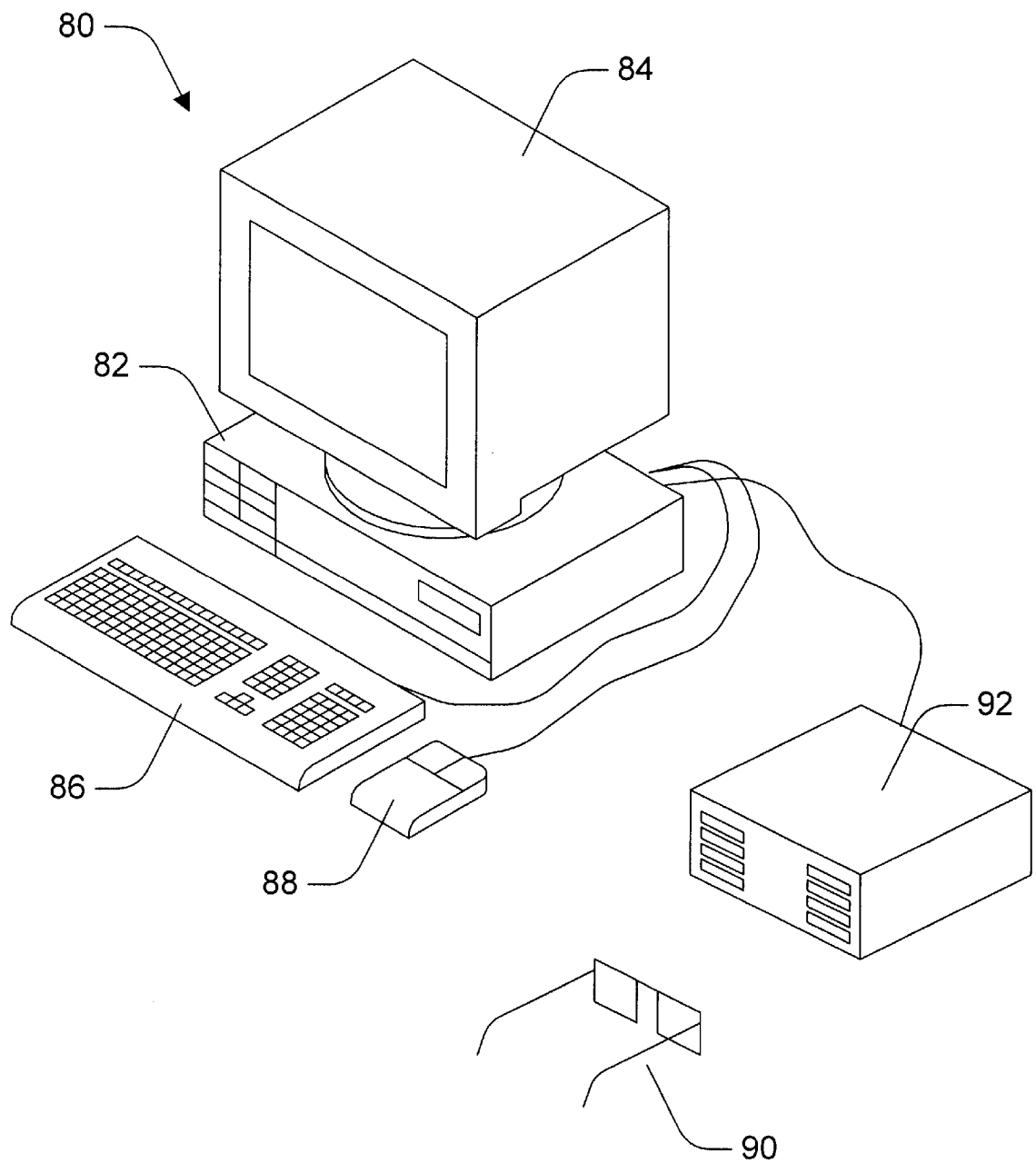
FIG. 3 illustrates one embodiment of a computer system capable of generating and playing back 3D movies generated using the method of FIG. 1.

Referring now to FIG. 3, one embodiment of a playback system 80 configured to playback 3D movies is shown. The playback system may be implemented as any of a number of different systems, including: a computer system, a network PC, an Internet appliance, a television (including HDTV systems and interactive television systems), personal digital assistants (PDAs), video display glasses, and other devices which are capable of receiving compressed frames and displaying 3D graphics.

As shown in the figure, the playback system 80 comprises a system unit 82 configured to read, decompress, and rasterize compressed 3D movies, and a video monitor or display device 84 coupled to the system unit 82. As previously noted, the display device 84 may be any of various types of display monitors (head-mounted or non-head-mounted). Optional eyeglasses 90 may be used with non-head-mounted displays. As described above, the glasses may be passive or active. Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to read, decompress, and display the 3-D movies on display device 84. In one embodiment, playback system 80 may comprise an array of storage devices 92 (e.g., an array of eight 5X DVD-ROMs coupled in a RAID configuration) configured to read compressed 3D movies from computer-readable media. Other embodiments are possible and contemplated.

Figure 4:
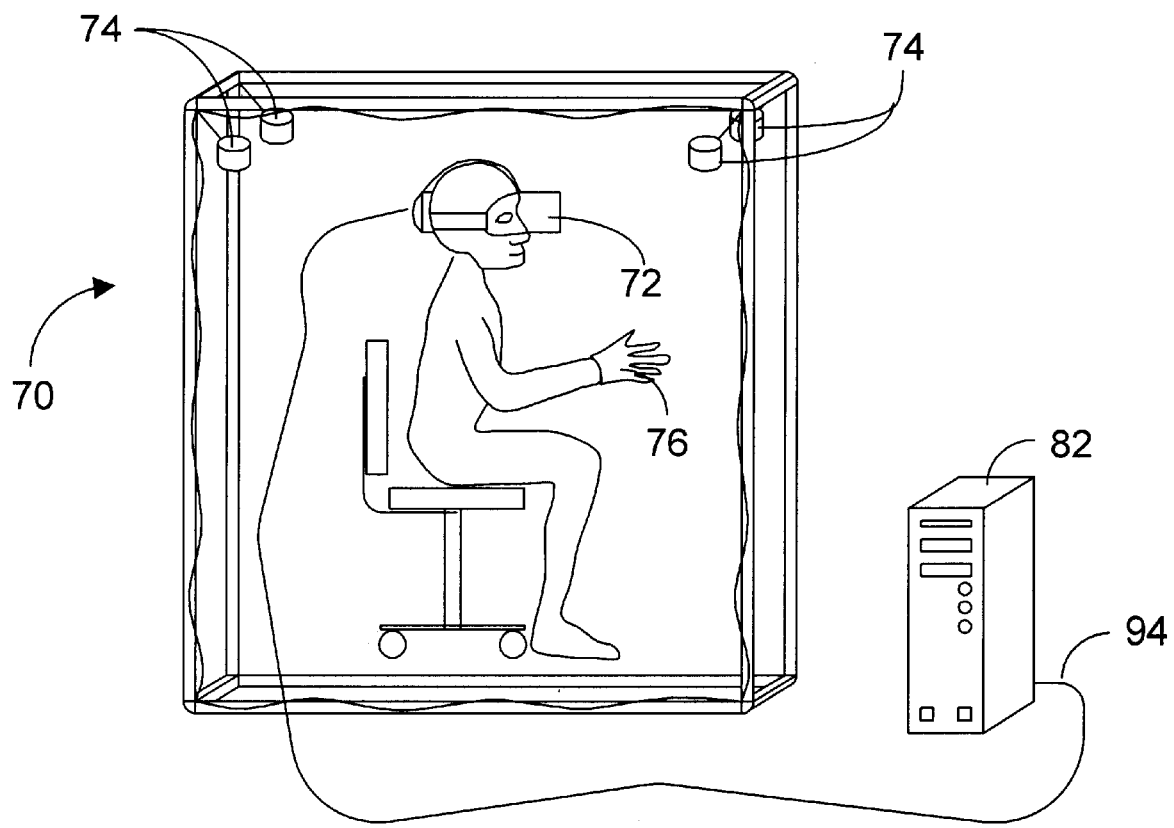
FIG. 4 is a diagram of one embodiment of a 3D movie playback system.

FIG. 4 illustrates another embodiment of a 3D movie playback system 70. In this embodiment, the system comprises a head-mounted display device 72, head-tracking sensors 74, and a data glove 76. Head mounted display 72 may be coupled to system unit 82 via a fiber optic link 94, or one or more of the following: an electrically-conductive link, an infrared link, or a wireless (e.g., RF) link. In this embodiment, system unit 82 does not utilize a storage array. Instead, system unit 82 receives compressed 3D movies via broadcast, Internet link, or satellite link (e.g., at a rate of 42 megabytes per second). Other embodiments are possible and contemplated.

Figure 5:
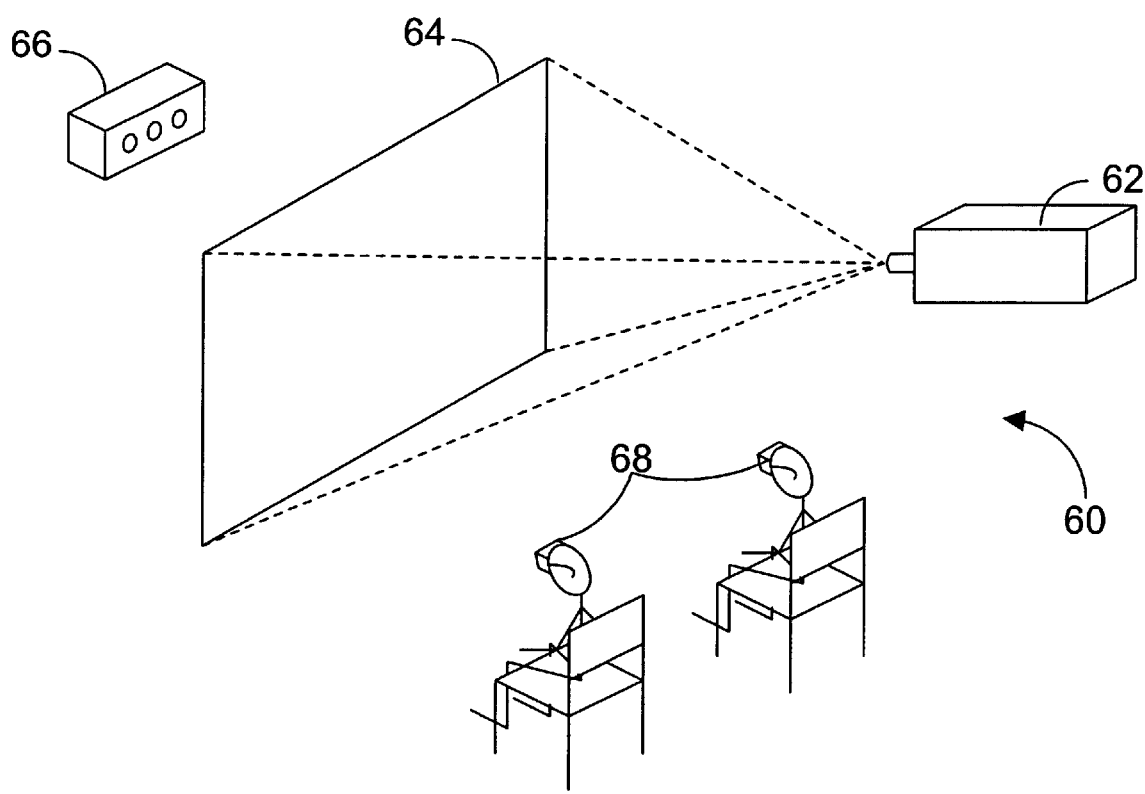
FIG. 5 is a diagram of another embodiment of a 3D movie playback system.

FIG. 5 illustrates another embodiment of a 3D movie playback system 60. In this embodiment, a digital projector 62 is configured to read, decompress, and rasterize 3D movies. Projector 62 is configured to project the 3D movie onto a display screen 64. Viewers may view display screen 64 with or without optional color filter glasses 68. Head-tracking sensor 66 is configured to determine the position of multiple viewer's heads with respect to display screen 64. For example, lead-tracking sensor 66 may detect viewers' positions by an infrared reflective dot placed on each viewer's forehead (or on optional glasses 68). In multi-viewer embodiments, projector 62 may be configured to perform multiplexing of the image projected onto screen 64. For example, with two viewers, four-way multiplexing may be performed (e.g., viewer 1 left eye, viewer one right eye, viewer 2 left eye, viewer 2 right eye).

Figure 6:
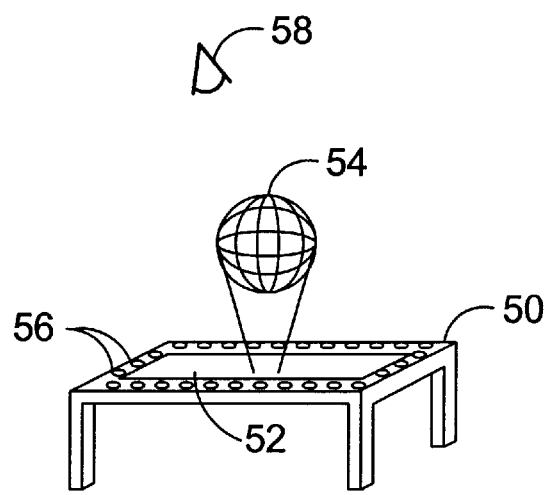
FIG. 6 is a diagram of yet another embodiment of a 3D movie playback system.

FIG. 6 illustrates yet another embodiment of playback system 50. In this embodiment, playback system 50 is implemented as a coffee table. A 3D image 54 is projected from top surface 52 (e.g., by a gas plasma display). As viewers move around the table, the 3D image changes to reflect the viewer's current position as detected by integral IR head-tracking sensors 56. The representation of image 54 is shown as perceived from viewpoint 58 (i.e., typical gas plasma displays cannot actually project an image into space, so image 58 is viewed from above by looking into top surface 52).

Figure 7:
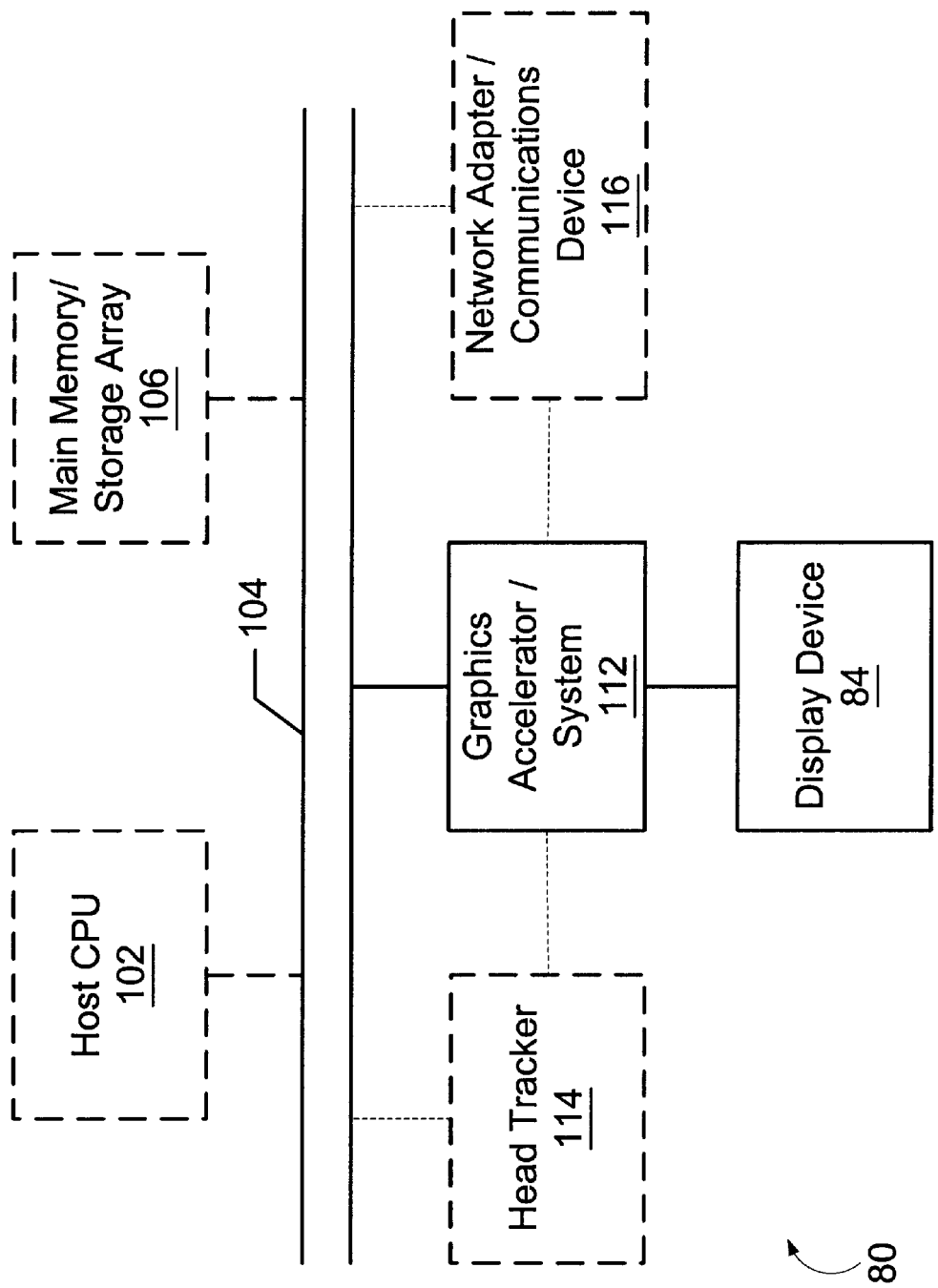
FIG. 7 is a block diagram illustrating more details of one embodiment of the playback system of FIG. 4.
Figure 8:
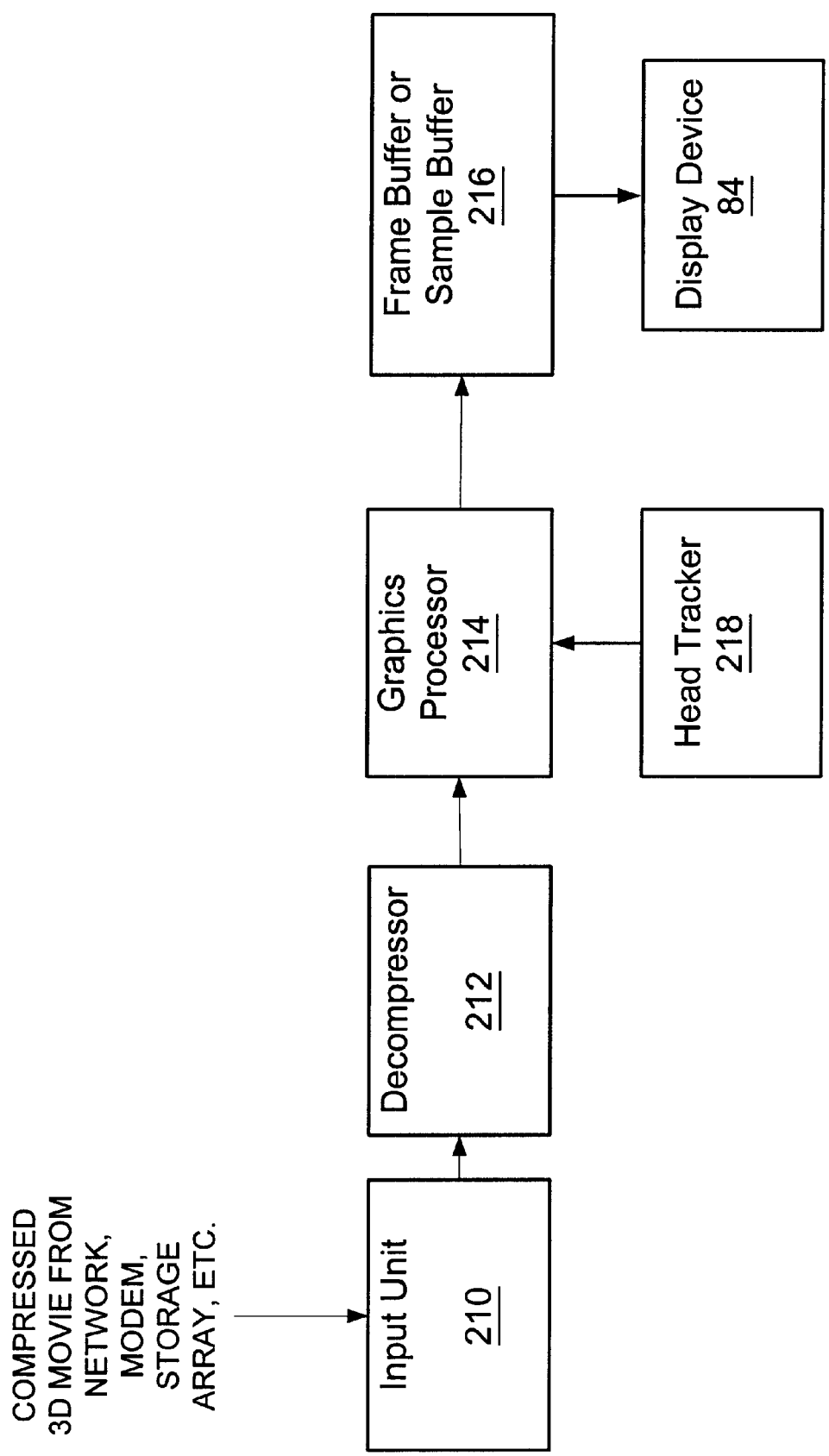
FIG. 8 is a block diagram illustrating another embodiment of a 3D movie playback system.

System Block Diagrams—FIGS. 7–8

Referring now to FIG. 7, a simplified block diagram illustrating the playback system of FIG. 1 is shown. Elements of the system that are not necessary for an understanding of the present invention are not shown for convenience. As shown, playback system 80 includes a host central processing unit (CPU) 103 coupled to a high-speed memory bus or system bus 105 also referred to as the host bus 105. A system memory or main memory or storage array 107 may also be coupled to high-speed memory bus 105.

Host processor 103 may comprise one or more processors of varying types, e.g., microprocessors, multi-processors and CPUs. The system memory 107 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices (e.g., DVD-ROM arrays, hard drive arrays, etc.). The system bus or host bus 105 may comprise one or more communication or host computer buses (for communication between host processors, CPUs, and memory subsystems) as well as specialized subsystem buses.

A 3-D graphics system or graphics system 112 may be coupled to the high-speed memory bus 105. The 3-D graphics system 112 may be coupled to the high-speed memory bus 105 by, for example, a crossbar switch or other bus connectivity logic. It is assumed that various other peripheral devices, or other buses, may be connected to the high-speed memory bus 105. Optional head-tracker 114 may be coupled to high-speed memory bus 105 or directly to graphics system 112. Optional network adapter/ communications device 116 may also be coupled to high-speed memory bus 105 or directly to graphics system 112.

It is noted that the 3-D graphics system may be coupled to one or more of the buses in playback system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 112 comprised in playback system 80.

Host CPU 103 may transfer information to and from the graphics system 112 according to a programmed input/output (I/O) protocol over host bus 105. Alternately, graphics system 112 may access the memory subsystem 107 according to a direct memory access (DMA) protocol or through intelligent bus mastering.

The graphics system may receive graphics data from any of various sources, including the host CPU 103 and/or the system memory 107, other memory or computer-readable media (e.g., a DVD-ROM array), or from an external source such as a transmission medium, e.g., a network, the Internet, or a 3D television broadcast.

Note while graphics system 112 is depicted as part of computer system 80, graphics system 112 may also be configured as a stand-alone device (e.g., with its own built-in display or link to a projector or head-mounted display). Graphics system 112 may also be configured as a single chip device or as part of a system-on-a-chip or a multi-chip module.

FIG. 8 illustrates yet another embodiment of 3D movie playback system 80. In this embodiment, playback system 80 comprises input unit 210, which may be a network connection, a bus adapter, bus interface logic, or other input mechanism with which to receive data. Input unit 210 may be configured to receive a stream of frames of a compressed 3D movie from a network, a modem, or other storage or transmission device. The frames received by input unit 210 are conveyed to decompressor 212 for decompression. Decompressor 212 may be a hardware decompressor (preferred) or a software decompressor. The decompressed frames are then conveyed to graphics processor 214, which is configured to translate the constituent micropolygons of the decompressed frame from world space to screen space. This may be performed using a viewpoint determined from information provided by head-tracking sensor 218. Once transformed to screen space, graphics processor applies any viewpoint-dependent lighting effects. The completely lit micropolygons are then rasterized by graphics processor 214 into sample/frame buffer 216. Display device 84 is refreshed from sample/frame buffer 216.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for generating three-dimensional movies comprising:
  receiving three-dimensional graphics data representing a scene;
  specifying viewpoint limitations for said scene;
  partially rendering, in a primarily viewpoint-independent manner, one or more frames representing said scene, wherein said partially rendering further comprises tessellating said three-dimensional graphics data into micropolygons to meet one or more predetermined criteria;

compressing said one or more partially rendered frames; and outputting said compressed frames to a carrier medium.

2. The method as recited in claim 1, wherein said one or more predetermined criteria comprise smoothness and predetermined size function in micropolygon size in world space.

3. The method as recited in claim 1, wherein said one or more predetermined criteria comprise an estimated worst-case micropolygon size in screen space.

4. The method as recited in claim 3, wherein said estimated worst-case micropolygon size in screen spaceis estimated using the distance from a closet permitted veiwpoint to a given micopolygon.

5. The method as recited in claim 3, said estimated worst-case micropolygon size in screen space is estimated using the combination of a worst-case distance from a closest permitted viewpoint to a given micropolygon and a worst-case viewing angle from said viewpoint to a given micropolygon.

6. The method as recited in claim 1, wherein said partially rendering comprises selecting micropolygons visible from viewpoints complying with said viewpoint limitations.

7. The method as recited in claim 1, wherein said partially rendering comprises performing a subset of lighting calculations for said micropolygons, wherein said subset of lighting calculations are mostly viewpoint-independent.

8. The method as recited in claim 7, wherein said subset of lighting calculations includes viewpoint-independent shadowing.

9. The method as recited in claim 7, wherein said subset of lighting calculations is selected from the group comprising: viewpoint-independent reflections, viewpoint-independent depth of field effects, viewpoint-independent bump mapping, and viewpoint-independent displacement mapping.

10. The method as recited in claim 1, wherein said specifying viewpoint limitations comprises specifying a viewpoint-limiting volume.

11. The method as recited in claim 10, wherein said viewpoint-limiting volume has a depth of zero and is a viewpoint-limiting surface.

12. The method as recited in claim 1, wherein said specifying viewpoint limitations comprises specifying a set of valid viewpoints and a set of valid viewpoint orientations.

13. The method as recited in claim 1, wherein said graphics data represents one or more three-dimensional graphics objects, and wherein said method further comprises tessellating said graphics data into a plurality of micropolygons in world space.

14. The method as recited in claim 1, wherein said partially rendering further comprises applying one or more lighting effects to said micropolygons, wherein said one or more lighting effects are viewpoint-independent.

15. The method as recited in claim 1, wherein said carrier medium is selected from the group comprising: transmission media and computer-readable media.

16. The method as recited in claim 1, wherein said compressed frames are configured to be read in a stream and rasterized in real-time using user-controlled viewpoint information.

17. The method as recited in claim 1, wherein said compressed frames are configured to be rasterized in real-time by applying viewpoint-dependent lighting effects.

18. The method as recited in claim 1, wherein each compressed frame comprises separate data.

19. The method as recited in claim 1, further comprising outputting said viewpoint limitations to said carrier medium.

20. The method as recited in claim 1, further comprising indicating when one or more portions of a particular frame may be reused in a subsequent frame.

21. The method as recited in claim 1, wherein only key frames are stored and intermediate frames are interpolated therefrom.

22. A method for playing back three-dimensional movies comprising:

reading a plurality of compressed frames from a carrier medium;

decompressing said compressed frames into a plurality of world-space micropolygons;

inputting viewer-controlled viewpoint information;

translating said micropolygons to screen-space;

applying one or more viewpoint-dependent lighting effects to said micropolygons;

rasterizing said micropolygons to generate a frame; and displaying said frame on a display device.

23. The method as recited in claim 22, further comprising applying viewpoint-dependent atmospheric effects to said micropolygons.

24. The method as recited in claim 22, further comprising applying viewpoint-dependent texture effects to said micropolygons.

25. The method as recited in claim 22, further comprising applying viewpoint-dependent reflection effects to said micropolygons.

26. The method as recited in claim 22, further comprising comparing said viewer-controlled viewpoint information with viewpoint limitations read from said carrier medium.

27. The method as recited in claim 22, further comprising forcing said viewer-controlled viewpoint information to comply with viewpoint limitations read from said carrier medium.

28. The method as recited in claim 22, wherein said translating, rasterizing, and displaying are performed in real-time.

29. The method as recited in claim 22, wherein each decompressed frame is translated to screen space, rasterized, and displayed in visual stereo.

30. The method as recited in claim 22, further comprising including:

reading a stream of compressed audio from said carrier medium;

decompressing said stream of compressed audio;

processing said decompressed audio to reflect said real-time viewer-controlled ear location information; and playing back said decompressed and processed audio.

31. A software program embodied on a first carrier medium, wherein said software program is configured to generate three-dimensional movies, wherein said software program comprises a plurality of instructions, wherein said plurality of instructions are configured to:

receive three-dimensional graphics data representing a scene;

specify viewpoint limitations for said scene based on viewer input;

partially render one or more frames representing said scene;

compress said one or more partially-rendered frames; and output said compressed frames to a second carrier medium, wherein said first carrier medium and said second carrier medium are selected from the group consisting of computer-readable media and transmission media.

32. A software program embodied on a first carrier medium, wherein said software program is configured to playback three-dimensional movies, wherein said software program comprises a plurality of instructions, wherein said plurality of instructions are configured to:
- read a plurality of compressed frames from a second carrier medium, wherein said first carrier medium and said second carrier medium are selected from the group consisting of computer-readable media and transmission media;
- decompress said compressed frames into a plurality of world-space micropolygons;
- input viewer-controlled viewpoint information;
- translate said micropolygons to screen-space;
- apply one or more viewpoint-dependent lighting effects to said micropolygons;
- rasterize said micropolygons to generate a frame; and
- display said frame on a display device.

33. A graphics system configured to playback previously generated three-dimensional movies, said graphics system comprising:
- an input means for reading a stream of compressed frames from a carrier medium, wherein said input means is further configured to receive viewpoint limitation information with said compressed frames;
- a decompressor coupled to receive and decompress said compressed frames into a plurality of partially-rendered world-space micropolygons;
- a graphics processor coupled to receive said partially-rendered world-space micropolygons; and
- a sensor coupled to provide said graphics processor with viewer viewpoint information, wherein said graphics processor is configured to translate said world-space micropolygons to screen-space micropolygons using said viewer viewpoint information, and wherein said graphics processor is configured to rasterize said screen-space micropolygons to generate one or more 3D frames in stereo.

34. The system as recited in claim 33, wherein said graphics processor is configured to force said viewer viewpoint information to comply with said viewpoint limitation information.

35. The system as recited in claim 33, further comprising a display device and a sample buffer, wherein said sample buffer is coupled between said graphics processor and said display device, wherein said sample buffer is super-sampled relative to the number of pixels displayable by said display device.

36. The system as recited in claim 33, wherein said graphics processor is further configured to perform a subset of lighting calculations on said partially-rendered world-space micropolygons.

37. The system as recited in claim 36, wherein said subset of lighting calculations includes all viewpoint-dependent lighting calculations.

38. The system as recited in claim 36, wherein said viewpoint-dependent calculations are selected from the group comprising: viewpoint-dependent reflections and viewpoint-dependent depth of field effects.

39. A method for generating three-dimensional movies comprising:
- receiving three-dimensional graphics data;
- specifying viewpoint limitations for said three-dimensional graphics data;
- tessellating said three-dimensional graphics data into micropolygons;
- partially rendering selected micropolygons, wherein said selected micropolygons are visible from viewpoints complying with said viewpoint limitations;
- compressing the partially rendered selected micropolygons; and
- outputting the compressed partially rendered selected micropolygons to a carrier medium.

40. The method as recited in claim 39, wherein said partially rendering comprises performing a subset of lighting calculations for said selected micropolygons, wherein said subset of lighting calculations are mostly viewpoint-independent.

41. The method as recited in claim 40, wherein said subset of lighting calculations is selected from the group comprising: viewpoint-independent reflections, viewpoint-independent depth of field effects, viewpoint-independent bump mapping, viewpoint-independent displacement mapping, and viewpoint-independent shadowing.

42. A method for generating three-dimensional movies comprising:
- receiving three-dimensional graphics data;
- specifying viewpoint limitations for said three-dimensional graphics data;
- tessellating said three-dimensional graphics data into micropolygons;
- partially rendering said micropolygons, wherein said partially rendering comprises performing a subset of lighting calculations for said micropolygons, wherein said subset of lighting calculations are mostly independent of said viewpoint limitations;
- compressing said partially-rendered micropolygons; and
- outputting said compressed partially-rendered micropolygons to a carrier medium.

43. The method as recited in claim 42, wherein said subset of lighting calculations is selected from the group comprising: viewpoint-independent reflections, viewpoint-independent depth of field effects, viewpoint-independent bump mapping, viewpoint-independent displacement mapping, and viewpoint-independent shadowing.

44. The method as recited in claim 42, wherein said outputting further comprises outputting said viewpoint limitations to a carrier medium.

45. A method for generating three-dimensional movies comprising:
- receiving three-dimensional graphics data representing a scene;
- specifying viewpoint limitations for said scene;
- partially rendering, in a manner independent of said viewpoint limitations, one or more frames representing said scene, wherein said partially rendering further comprises tessellating said three-dimensional graphics data into micropolygons, wherein said partially rendering comprises performing a subset of lighting calculations for said micropolygons, and wherein said subset of lighting calculations are mostly independent of said viewpoint limitations;
- compressing said one or more partially-rendered frames; and
- outputting said compressed frames to a carrier medium.

46. A graphics system configured to playback previously generated three-dimensional movies, said graphics system comprising:
- an input means for reading a stream of compressed frames from a carrier medium, wherein said input means is further configured to receive viewpoint limitation information with said compressed frames;

a decompressor coupled to receive and decompress said compressed frames into a plurality of partially rendered world-space micropolygons;

a graphics processor coupled to receive said partially-rendered world-space micropolygons; and a sensor coupled to provide said graphics processor with viewer viewpoint information, wherein said graphics processor is configured to translate said world-space micropolygons to screen-space micropolygons using said viewer viewpoint information and to force said viewer viewpoint information to comply with said viewpoint limitation information, and wherein said graphics processor is configured to rasterize said screen-space micropolygons to generate one or more 3D frames in stereo.

47. A software program embodied on a first carrier medium, wherein said software program is configured to generate three-dimensional movies, wherein said software program comprises a plurality of instructions, wherein said plurality of instructions are configured to:

receive three-dimensional graphics data;

specify viewpoint limitations for said three-dimensional graphics data based on viewer input;

tessellate said three-dimensional graphics data into micropolygons;

partially render said micropolygons, wherein said partially render comprises performing a subset of lighting calculations for said micropolygons, wherein said subset of lighting calculations are mostly independent of said viewpoint limitations;

compress said partially-rendered micropolygons; and output said compressed partially-rendered micropolygons to a second carrier medium, wherein said first carrier medium and said second carrier medium are selected from the group comprising computer-readable media and transmission media.

48. A software program embodied on a first carrier medium, wherein said software program is configured to playback three-dimensional movies, wherein said software program comprises a plurality of instructions, wherein said plurality of instructions are configured to:

read compressed partially-rendered three-dimensional graphics data from a second carrier medium, wherein said first carrier medium and said second carrier medium are selected from the group comprising computer-readable media and transmission media;

decompress said compressed partially-rendered three-dimensional graphics data into a plurality of world-space micropolygons;

receive viewer-controlled viewpoint information;

partially render said micropolygons, wherein said partially render comprises performing a subset of lighting calculations for said micropolygons, wherein said subset of lighting calculations are mostly dependent on said viewer-controlled viewpoint information;

rasterize said micropolygons to generate a frame; and display said frame on a display device.

49. A method for playing back three-dimensional movies comprising:

reading compressed partially-rendered three-dimensional graphics data and viewpoint limitation information from a carrier medium;

decompressing said compressed partially-tendered three-dimensional graphics into a plurality of world-space micropolygons;

inputting viewer-controlled viewpoint information, wherein said viewer-controlled viewpoint information is forced to comply with said viewpoint limitation information;

translating said micropolygons to screen-space;

applying one or more viewpoint-dependent lighting effects to said micropolygons;

rasterizing said micropolygons to generate a frame; and displaying said frame on a display device.

\* \* \* \* \*

UNITED STATES PATENT AND TRADEMARK OFFICE
CERTIFICATE OF CORRECTION

PATENT NO. : 6,429,867 B1
DATED : August 6, 2002
INVENTOR(S) : Michael F. Deering It is certified that error appears in the above-identified patent and that said Letters Patent is hereby corrected as shown below:

Column 13,
Line 12, please delete "spaceis" and substitute -- space is --.

Signed and Sealed this

Eleventh Day of February, 2003

JAMES E. ROGAN
*Director of the United States Patent and Trademark Office*